United States Patent

Appleby et al.

[11] Patent Number: 4,487,522
[45] Date of Patent: * Dec. 11, 1984

[54] JOINING DEVICE

[75] Inventors: Robert H. Appleby, Gerrards Cross; Peter L. Cove, London, both of England

[73] Assignee: Titus Tool Company Limited, Great Britain

[*] Notice: The portion of the term of this patent subsequent to Jul. 27, 1999 has been disclaimed.

[21] Appl. No.: 379,303

[22] Filed: May 18, 1982

Related U.S. Application Data

[63] Continuation of Ser. No. 96,544, Nov. 21, 1979, Pat. No. 4,341,485, which is a continuation-in-part of Ser. No. 52,940, Jun. 28, 1979, abandoned.

[30] Foreign Application Priority Data

Nov. 24, 1978 [GB] United Kingdom ............... 46048/78
Oct. 19, 1979 [GB] United Kingdom ................. 7936286

[51] Int. Cl.³ ............................................... F16B 9/02
[52] U.S. Cl. ..................................... 403/231; 403/362
[58] Field of Search ................ 403/231, 245, 253, 362

[56] References Cited

U.S. PATENT DOCUMENTS

| | | | |
|---|---|---|---|
| 1,958,817 | 5/1934 | Gase | 403/362 X |
| 4,047,822 | 9/1977 | Lehmann | 403/187 |
| 4,116,573 | 9/1978 | Fuchs | 403/264 |
| 4,160,610 | 7/1979 | Austen-Brown | 403/231 X |
| 4,163,618 | 8/1979 | Giovannetti | 403/245 |
| 4,341,485 | 7/1982 | Appleby et al. | 403/231 |

FOREIGN PATENT DOCUMENTS

| | | | |
|---|---|---|---|
| 2358163 | 6/1974 | Fed. Rep. of Germany | 403/231 |
| 6601003 | 7/1966 | Netherlands | 403/231 |

Primary Examiner—Andrew V. Kundrat
Attorney, Agent, or Firm—Lerner, David, Littenberg, Krumholz & Mentlik

[57] ABSTRACT

A device for joining furniture panels comprises a pin (2) in the form of a steel screw having a commonly employed thread on its shank, which can be any of the standard threads used on screws for insertion in wood and chipboard. The screw is inserted into one edge of a panel (4). The screw is symmetrical about its axis so its angular orientation is irrelevant. The other part of the device is a plug-like holding member (8) fitted into a recess (10) in the face of another panel (12). A grub screw (66) is screwed into the holding member (8) and pushes against the head of the screw (2) to clamp the two panels together. Screw (2) can be manufactured cheaply on common screw making machines, does not need to be orientated, has a collar (18) to ensure automatic correct axial positioning, is thin thus involving little risk of bursting the edge of panel (4), and does not need to be of cranked shape for use in relatively thin panels (4).

2 Claims, 9 Drawing Figures

FIG. 6
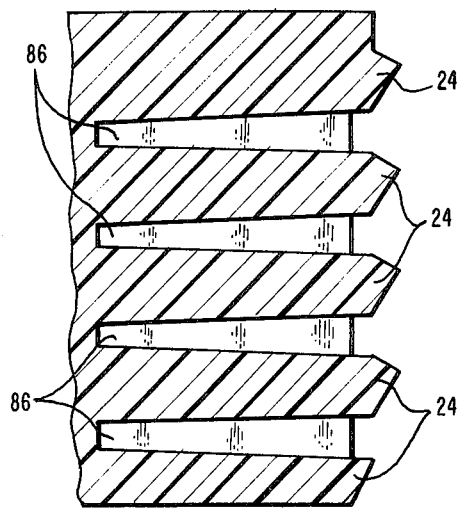
FIG. 7a
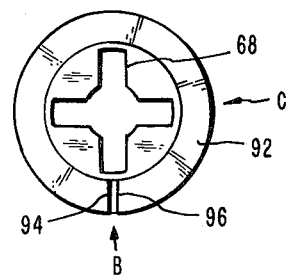
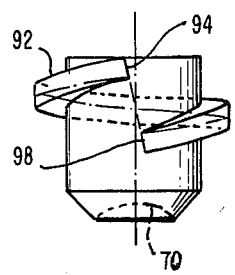
FIG. 7b
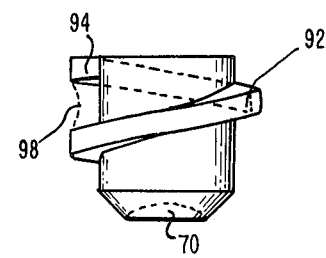
FIG. 7c

JOINING DEVICE

This application is a continuation of Application Ser. No. 096,544 filed on Nov. 21, 1979, now U.S. Pat. No. 4,341,485 which Application is a continuation-in-part of Application Ser. No. 052,940 filed on June 28, 1979, now abandoned the benefits of which are hereby claimed under the provisions of 35 U.S.C. §120.

FIELD OF THE INVENTION

This invention relates to a joining device for joining panels.

The main application of the invention is in joining together at right angles furniture panels made of chipboard, as is very commonly done in the furniture industry, especially in furniture which is sold in the form of pre-prepared and finished panels to be assembled into an item of furniture by the customer. Furniture in that form is usually referred to as "knocked-down" and the type of joining device usually employed is therefore frequently referred to as a KD fitting.

BACKGROUND OF THE INVENTION

KD fittings often consist of two basic parts, one of which is secured into the edge of one panel and the other of which is fitted into the surface of another panel, and lies substantially flush with the surface. To join the panels at right angles the part projecting from an edge of one panel is secured within the part recessed into the other panel, with the two panels held at right angles.

In one particular type of KD fitting which has been widely used the part that fits into an edge of a panel is a pin made of plastics material, the pin having a shank which is pushed into a hole drilled into the edge of the panel and a head which, when the pin is fully inserted, projects beyond the edge of the panel so as to be engageable with the other part of the fitting. The shank part of the pin is split and has external teeth and a bore runs through the centre of the pin so that after inserting the pin into the hole in the panel a thin steel rod can be driven into the bore in the centre of the pin to spread its shank thus securing the pin in the edge of the panel. In an alternative form the pin is solid and is simply driven into the hole in the panel edge. An example of a fitting of that general kind is shown in British patent specification No. 1,295,470.

The other part of the fitting, recessed into the other panel, contains a specially formed component having a helicoidal camming surface around it and a screwdriver recess at one end. The camming surface engages with a specially formed head on the pin so that when the component is turned the two parts of the fitting are drawn more tightly together, thus tightening the two panels against each other.

That type of fitting has the advantages that one part of the fitting engages loosely in the other part initially thus providing preliminary location while the fitting is being completely tightened, and it can be tightened, using a screwdriver, by applying less than a whole turn to the cammed screw. However, it also has various disadvantages. The plastic pin is of substantial diameter and therefore it has to be rather accurately located near the centre of the panel thickness. Otherwise, one side of the pin may be too close to the surface of the board in which case there is a risk of bursting the board. The teeth on the outside of the pin have a tendency to damage chipboard material in such a way that the pin is not as securely held within the material as is desirable. Fitting a pin of substantial diameter accurately into the edge of a board is an awkward and expensive operation in mass production. The head end of the pin has to be specially formed to co-operate with the cammed screw, and normally in practice is also cranked relative to the pin shank. Both these factors result in it being necessary for the pin to have a predetermined orientation about its axis when fitted into the panel edge. This increases the expense of fitting the pin into the panel edge. There is also a tendency for the cammed screw to loosen during use, especially if subjected to vibration, which loosens the joint between the panels.

Despite these disadvantages fittings of that kind have been quite widely used for ten years or so.

An object of the present invention is to provide a joining device, or KD fitting, in which one or more of the above disadvantages is substantially reduced.

SUMMARY OF THE INVENTION

The invention provides a joining device for joining panels, comprising a pin to be secured into one panel, the pin having a head portion, a holding member adapted to be fitted in a recess in the other panel, the holding member comprising a plug-like body portion having an opening for receiving said head portion, and a securing member, the securing member being accessible at that side of the body portion in which said opening lies and being operable while within the body portion to draw said head portion inwardly of the body portion by pressing on said head portion to tighten a joint between panels, the pin being a steel screw having a threaded shank and a head portion of which at least part is substantially symmetrical around the pin axis, the head portion including means engageable by a rotary driving implement.

By providing the pin with a substantially symmetrical portion with which the securing member can co-operate, the need for any special orientation of the pin about its axis is eliminated and this simplifies and reduces the cost of inserting the pins into panel edges. Since the pin is in the form of a screw, no special equipment is needed to insert it; any suitable screw driving equipment can be employed. Since the relevant part of the screw is symmetrical the angular position of the screw about its own axis when driving is terminated does not matter. Because the pin is a steel screw, it can be much thinner than a plastics pin and consequently is less likely to burst the panel edge; it causes less damage to the panel material when being inserted; it does not have to be cranked even for use in the edge of relatively thin panels, which cranking is necessary for practical reasons when using relatively thick plastics pins. All these advantages are obtained while at the same time the screw is, of course, cheaply manufactured on commonly available machines.

It is further preferred for the head portion of the pin to include a stop portion located a predetermined axial distance from said substantially symmetrical part, the stop portion limiting the extent to which the pin can be driven into a panel. By driving the pin in to that extent, the final spacing of the symmetrical part from the panel edge is predetermined.

The screw will preferably have two threads, one between the other, and one of larger outside diameter than the other. Screws having threads of this form are commercially available.

In a preferred embodiment specifically described below, the securing member comprises a rotatable member so engaged with the body portion that rotation of the securing member causes it to travel relative to the body portion, the securing member having an end surface which bears on said head portion of the pin applying force thereto in the direction of said travel thereby to tighten a joint between panels.

In the embodiment illustrated this securing member is in the form of a grub screw. In general, and irrespective of the type of pin employed, this type of securing member, which achieves the tightening effect by travelling bodily, has the advantage as compared with the cam type disclosed in the above-mentioned British patent specification, that the range of tightening movement available can be very much greater and, in principle, unlimited whereas the amount of tightening movement of the cam type is limited to the pitch of the cam. Once that amount of movement has been used, no more is available for further tightening. Also, the tightening force available can be made greater.

The travel of the securing member is preferably in a direction making an acute angle with the pin, when the latter is in its working position relative to the holding member.

BRIEF DESCRIPTION OF THE DRAWINGS

In order that the invention may be more clearly understood, embodiments thereof will now be described, by way of example, with reference to the accompanying diagrammatic drawings, in which:

FIG. 6 is an enlarged view in cross-section taken on the line VI—VI in FIG. 5;

FIG. 7a is a plan view of a screw to be used as securing member within the body portion of FIGS. 4 and 5, taken looking down on its head;

FIG. 7b is a side view of the screw from the direction of arrow B; and

FIG. 7c is a side view of the screw from the direction of arrow C.

DETAILED DESCRIPTION OF EMBODIMENTS

Figure 1:
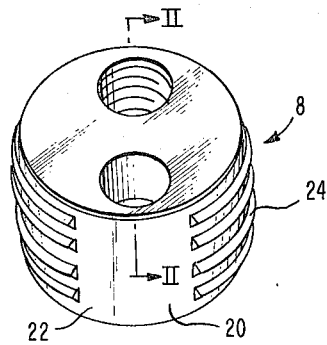
FIG. 1 is a perspective view of the holding member of a KD fitting in accordance with the invention.
Figure 2:
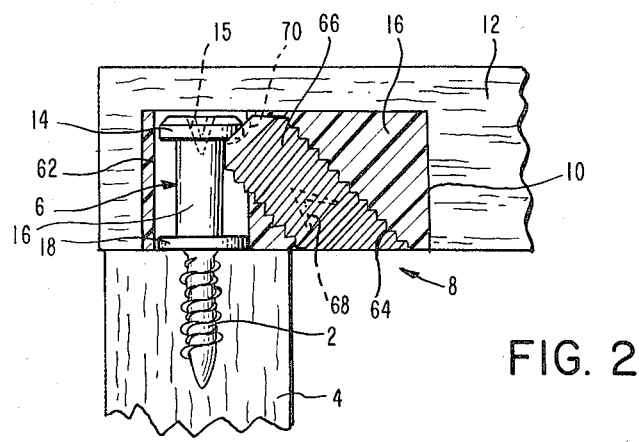
FIG. 2 is a cross-section through a complete KD fitting in accordance with the invention securing two panels together at right angles, the cross-section being taken on the line II—II of FIG. 1.

Referring to FIGS. 1 and 2, it can be seen that the joining device or KD fitting comprises a pin 2 which is driven into the edge of one panel 4 with its head portion 6 left protruding from the edge, and a holding member 8 which is firmly fitted into a recess 10 in the face of the other panel 12. A tightening mechanism in the holding member 8 enables the head portion 6 of the pin to be pulled inwardly of the holding member thus tightly securing the two panels into the positions shown in FIG. 2.

The pin 2 is in the form of a steel screw the head portion 6 of which has three parts namely, a driving head 14 provided with a transverse slot or a cross-shaped recess 15 so that a screw-driver bit can be employed to drive the screw into the panel, an intermediate shank portion 16, and an integral or separate collar or stop portion 18 which is spaced a predetermined distance away from the driving head 14. The collar or stop portion 18 ensures that when the screw is fully driven into the panel 4, up to the collar or stop, the underside of the driving head 14 will always be a predetermined distance away from edge of the panel 4. A separate collar 18 is preferred because it can freely rotate and thus will not grind against, and damage, the panel edge when tightened into the panel edge.

The holding member 8 is shown in more detail in FIG. 1. It comprises a body portion 20 moulded from plastics material and which includes a cylindrical outer wall 22 formed with external ribs 24 which grip firmly into the wall of the recess 10 when the body portion is pressed into the recess to fix it in panel 12. The holding member 8 is provided with two intersecting bores 62 and 64. Bore 62 receives the head portion 6 of the pin 2 and bore 64 is provided with an internal thread to mate with the external thread of a securing member in the form of a grub screw 66, which has a cross-shaped driving recess 68 provided in its upper end.

Once the head of the pin 2 has been loosely positioned in the bore 62, the grub screw 66 is screwed into the bore 64 so that its leading end contacts the underside of the driving head 14 of the screw 2 and then continued rotation of grub screw 66 draws the head tightly into the body portion and hence tightens the joint. The leading end of the grub screw is provided with a recessed end surface indicated in broken lines at 70 so as to spread the contact pressure between the grub screw 66 and the driving head 14 of screw 2 over a greater area.

Figure 3:
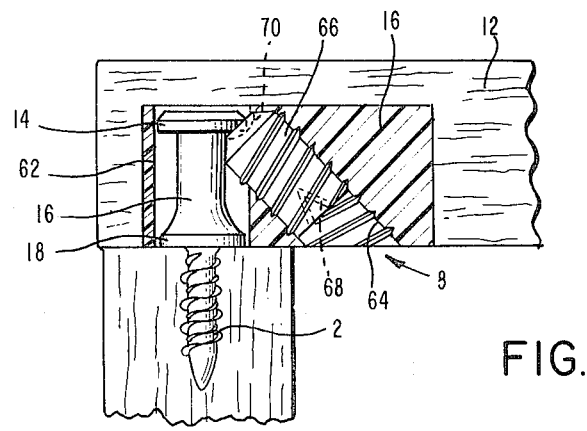
FIG. 3 is a cross-section through a further type of KD fitting in accordance with the invention.

Grub screw 66 is shown as having a fairly fine thread, but in an alternative version shown in FIG. 3 it may be provided with a very coarse pitched thread, for example a thread making only two turns along the whole length of the screw, the thread shown having a double-start version of the thread used on pin 2. A matching thread is provided on the inside of the bore 64. With this modified arrangement the screw 66 would move through its whole length in response to two rotations thus simplifying tightening of the joint. The ribs of the thread could be on the wall of bore 64 and the matching grooves on the outside of screw 66.

The thread may have only one turn in the whole length of the screw. Generally, it is desirable for the thread to have four or less, and preferably two or less, turns, when the length of the screw is approximately equal to the diameter of its body (excluding threads). If the screw does not have such relative dimensions, nevertheless a similar range of thread angles is desirable.

It should be appreciated that the arrangements shown can have a greater range of tightening movement than can a cam arrangement as employed in the prior art. They also are more resistant to vibration than a non-detented cam and can exert a stronger force on the head of the pin than can a cam. In combination with the improved holding force obtained by using a steel screw as the pin, this results in a stronger and more rigid joint than is obtainable with the prior art device described hereinbefore.

Referring now to the further embodiment shown in FIGS. 4 to 7c, this has many features in common with the previous embodiments, and to that extent the same reference numerals have again been used. Such common features will not be described in detail again.

Figure 4:
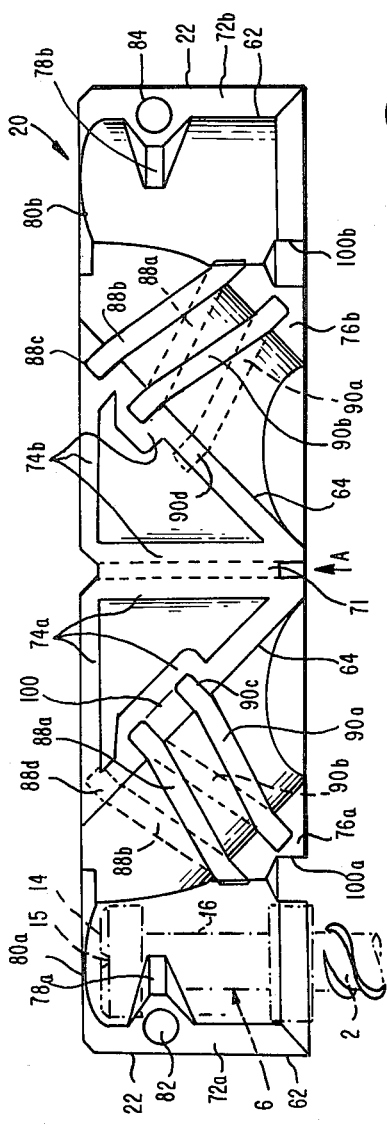
FIG. 4 is an elevational view of the body portion of a further embodiment of the invention.
Figure 5:
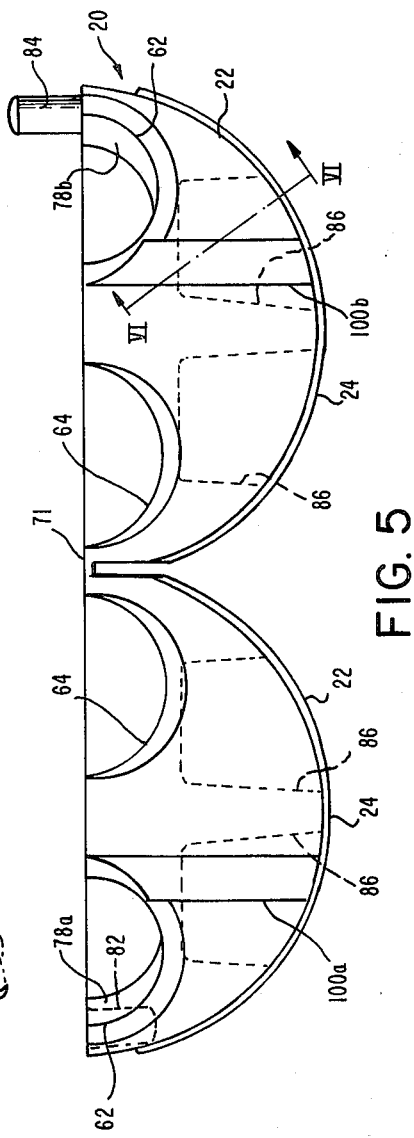
FIG. 5 is a view of the component of FIG. 4 taken in the direction of the arrow A.

The body member 20 shown in FIGS. 4 and 5 is a plastics moulding comprising two halves as indicated, linked by a thin plastics bridge or hinge 71, so that by folding the two halves about the hinge 71 and upwardly out of the paper relative to FIG. 4, or vertically in the plane of the paper relative to FIG. 5, a plug-like body portion generally similar to that shown in FIG. 1 is formed. In that condition, the flat surfaces 72a and 72b abut each other, as do the flat surfaces 74a, 74b and flat surfaces 76a, 76b, these surfaces all lying on the dividing line between the two halves.

It can be seen that the bore 62 is split axially, with one half lying in one of the body halves, and the other half laying in the other body half. Within the bore 62 an inward radial projection is moulded, again in two matching halves 78a, 78b. The projection is generally arcuate, tapering away towards its two ends as best seen in FIG. 5. The projection 78a, 78b, together with an end wall portion 80a, 80b, forms a converging pocket between the two, into which the symmetrical head 14 of the screw 2 (all components of the screw being shown in broken lines in FIG. 4) is forced when the joint is tightened. It has been found that this makes for a firmer joint and especially gives great resistance to the stresses arising when the panels are forced angularly towards each other. Additionally, the projection 78a, 78b, provides a physical cushion or reinforcement which helps to resist breakage of the cylindrical wall of the body portion if the joint is greatly overtightened and also projection portion 78a provides a body of material within which a socket 82 can be moulded, this socket receiving and retainingly fitting a pin 84 when the body portion 20 is folded into its plug-like form. The pin 84 is moulded onto the surface of projection part 78b which is presented at the dividing line of the body portion halves as shown on the right in FIGS. 4 and 5.

A further feature which can be seen from FIGS. 5 and 7 is that between the peripheral gripping ribs 24 deep recesses or slots 86 are moulded, which give the ribs a degree of resilience which has been found to be useful since they can deflect a little when the body portion is being pushed into its recess in a board, thus making this insertion easier, and then resume their original position where, it has been found, their gripping effect is not significantly weakened. It can be seen from FIG. 6 that the edges of the gripping ribs 24 have a non-symmetrical form, the direction of insertion of the body portion into its recess being downwards in relation to FIG. 6. The recesses 86 also offer an economical advantage in reducing the amount of material needed to mould the body portion.

The bore 64 is also axially divided between the two halves of the body portion and the thread within it is formed by two thread groove portions 88a and 90a in the left-hand half and two groove portions 88b and 90b in the right-hand portion. In broken lines in FIG. 4, the positions which groove portions 88b and 90b would occupy when the body portion is closed are shown on the left-hand side and on the right-hand side the relative positions which groove portions 88a and 90a would occupy are similarly shown in broken lines.

When the two body portion halves are folded together, the groove portions 88a, 88b, 90a, 90b together form a single thread which makes two complete revolutions and which is terminated by an abutment surface portion at each end. It can be seen from the right-hand side of FIG. 4 that the upper end of groove portion 88b, indicated at 88c is moulded open, but when the halves are folded together the surface portion indicated at 88d on the left of FIG. 4 closes the end of this groove and consequently forms one of the thread end abutment surfaces. Surface portion 90d on the right half of FIG. 4 co-operates similarly with the open end 90c of groove portion 90a on the left of FIG. 4, to form an abutment surface terminating the other end of the thread when the two portions are closed.

FIGS. 7a, 7b and 7c show a screw particularly designed to co-operate with the body portion described with reference to FIGS. 4 to 6. It is a one-piece moulding or casting in suitable strong plastics material or metal.

As in the previous embodiments, the screw has a driving recess 68 in its top end and a rounded recess 70 in its bottom end. It has a single thread 92 of substantially rectangular cross-section which extends 360° or a little less around the body of the screw and which terminates at each end in a substantially flat abutment surface, these being shown at 94 and 96. When the screw is positioned in the body portion, co-operating with the thread which has already been described, it can move through one whole turn between the outermost abutment position where surface 94 on the screw contacts surface portion 90d and the innermost position where surface 96 on the screw contacts surface portion 88b.

The innermost stop has been found to be desirable because this embodiment works so well that a strong individual can tighten the joint sufficiently to cause damage. To prevent this, the stop is positioned such that, with a device manufactured to the exact middle of the design tolerances, the intended fully-tightened position is reached when the screw still has one-eighth more of a turn to go before hitting the inner stop. If it is overtightened through this amount and up to the stop, no damage is caused. The outer stop is provided so that once the device has been assembled with the screw inside it, the screw cannot be extracted by unscrewing it.

The particular screw design shown in FIGS. 7a to 7c has the interesting and economical characteristic that it can be molded or cast using a die having two parts which separate from each other in a direction along the screw axis and along a parting line indicated by the heavy chain-dotted line in FIG. 7b, which goes around the periphery of the single turn of the thread and is completed by a parting line portion which links the adjacent corners of the end surfaces 94, 96 and goes along the surface of the main body of the screw.

It is preferred to mould or cast the screw with deliberate flash left along this portion of the parting line as indicated in broken lines at 98 in FIG. 7c. Then, on assembly, the screw can be positioned in its bore with this flash against the surface portion indicated at 100 on the left of FIG. 4 and the flash will become trapped between surface portion 100 and the mating surface portion on the other side of the body portion 20 when the body portion halves are closed together. This ensures that the screw cannot rotate in its bore through vibration or rough handling during transit, which does occur in the securing devices employed in many prior art types of KD fitting, so that the screw will necessarily always be in the correct position for free insertion of the pin into the body portion, followed by tightening of the screw, which tightening will cause the flash to break away.

The body portion 20 is also formed with two slot portions 100a and 100b which in the fully assembled body portion form one continuous slot extending across the surface of the body portion that lies flush with the surface of the panel. The purpose of the slot is to receive a tongue or pegs on a special co-operating fitting which may be employed when the device of the present invention is used to secure a rail between two end panels, one device being employed at each end of the rail. In these circumstances, of course, there is the possibility of the rail twisting, and the engagement of the special tongue or pegs in the groove 100a, 100b resists this.

The screw of FIGS. 7a and 7b may have its body diameter slightly greater on one side of the single thread than on the other, and the diameter of the bore in which it fits may have a corresponding stepped diameter. This ensures that the screw can only be fitted into the body portion, and the latter be fully closed, if the screw has been placed the right way round.

What is claimed is:

1. A joining device for joining panels at right angles to each other, comprising an element having a head portion and adapted to be secured into one of said panels with said head portion projecting from an edge thereof, a holding member adapted to be fitted in a recess provided in a major surface of the other of said panels, said holding member comprising a plug-like body portion having an end face arranged to be exposed at said major panel surface and having an opening extending therein axially from said end face to receive and surround said head portion, an inward projection within said opening located and dimensioned so that at least a part of said head portion can initially be inserted into said opening in a direction substantially parallel to the axis of said element and thereafter be further inserted into said opening past said projection to engage said projection therebehind, and a securing member located within said body portion and adjacent to said opening, said securing member being operable from said end face and effective when operated to engage said head portion from one side thereof to apply a force directly thereto in a manner to draw said head portion inwardly relative to said opening to tighten the joint formed by said panels, said inward projection engaging said head portion from the other side thereof.

2. A joining device for joining panels, comprising an element to be secured into one panel, the element having a head portion to project from an edge of said one panel, a holding member adapted to be fitted in a recess in a major surface of the other panel, the holding member comprising a plug-like body portion having an opening extending axially for receiving and surrounding said head portion, and a rotatable securing member, the securing member and said opening both being accessible from the same side of the body portion, and the securing member being so engaged with the body portion that rotation of the securing member while within the body portion causes it to travel relative to the body portion, the securing member having an end surface which bears on said head portion of the element applying force thereto in the direction of said travel to draw said head portion substantially axially inward relative to said opening thereby tighten a joint between panels, and the body portion being provided with means cooperating with the securing member to restrict its travel in the tightening direction.

* * * * *